(12) United States Patent
Shpigelman

(10) Patent No.: US 9,517,515 B2
(45) Date of Patent: Dec. 13, 2016

(54) END MILL CONVEX RADIAL RELIEF SURFACE AND CORNER HAVING CIRCULAR ARC PROFILE

(71) Applicant: Iscar, Ltd., Tefen (IL)

(72) Inventor: Leonid Shpigelman, Carmiel (IL)

(73) Assignee: Iscar, Ltd., Tefen (IL)

( * ) Notice: Subject to any disclaimer, the term of this patent is extended or adjusted under 35 U.S.C. 154(b) by 168 days.

(21) Appl. No.: 14/486,118

(22) Filed: Sep. 15, 2014

(65) Prior Publication Data

US 2016/0074947 A1    Mar. 17, 2016

(51) Int. Cl.
*B23C 5/10*    (2006.01)

(52) U.S. Cl.
CPC .............. *B23C 5/10* (2013.01); *B23C 5/1009* (2013.01); *B23C 2210/082* (2013.01); *B23C 2210/084* (2013.01); *B23C 2210/44* (2013.01)

(58) Field of Classification Search
CPC .... B23C 5/10; B23C 5/1009; B23C 2210/082; B23C 2210/084
See application file for complete search history.

(56) References Cited

U.S. PATENT DOCUMENTS

| | | | | |
|---|---|---|---|---|
| 7,402,004 B2* | 7/2008 | Tanaka | ............ | B23C 5/10 407/53 |
| 7,997,834 B2* | 8/2011 | Aoki | ............ | B23C 5/10 407/113 |
| 2003/0180104 A1 | 9/2003 | Kuroda et al. | | |
| 2004/0120777 A1 | 6/2004 | Noland | | |
| 2005/0025584 A1* | 2/2005 | Kolker | ............ | B23C 5/10 407/54 |
| 2005/0105973 A1* | 5/2005 | MacArthur | ............ | B23C 5/10 407/53 |
| 2007/0286691 A1 | 12/2007 | Glimpel et al. | | |
| 2008/0273932 A1* | 11/2008 | Aoki | ............ | B23C 5/10 407/53 |
| 2009/0185878 A1 | 7/2009 | Turrini | | |
| 2011/0268513 A1 | 11/2011 | Takagi et al. | | |
| 2014/0133926 A1 | 5/2014 | Budda et al. | | |

FOREIGN PATENT DOCUMENTS

| | | |
|---|---|---|
| JP | 2004-141975 A * | 5/2004 |
| JP | 2005-319558 A * | 11/2005 |
| JP | 2007-030074 A * | 2/2007 |
| JP | 2008-110472 A * | 5/2008 |
| JP | 2010-167520 A * | 8/2010 |

OTHER PUBLICATIONS

International Search Report dated Jan. 14, 2016, issued in PCT counterpart application No. PCT/IL2015/050810.
Written Opinion dated Jan. 14, 2016, issued in PCT counterpart application No. PCT/IL2015/050810.

* cited by examiner

*Primary Examiner* — Daniel Howell
*Assistant Examiner* — Ryan Rufo
(74) *Attorney, Agent, or Firm* — Womble Carlyle

(57) ABSTRACT

An end mill includes a tooth having a convex radial relief surface, a corner with a circular arc profile, a rake surface and a corner relief surface. The corner relief surface extends rearward of a radial tangent plane defined in relation to the circular arc profile.

13 Claims, 4 Drawing Sheets

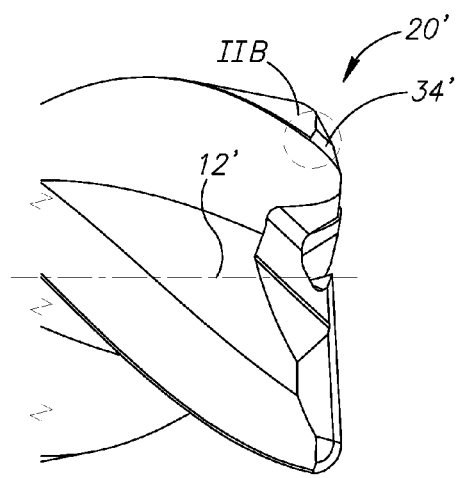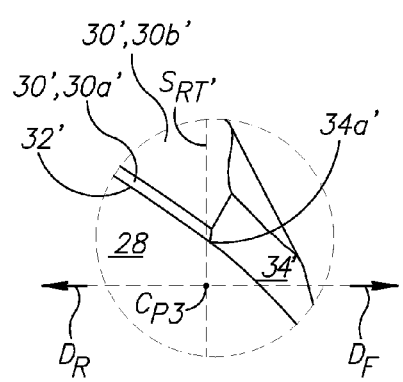
FIG.2A (PRIOR ART)   FIG.2B (PRIOR ART)
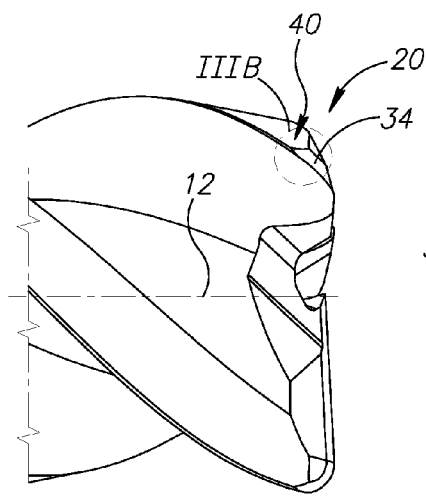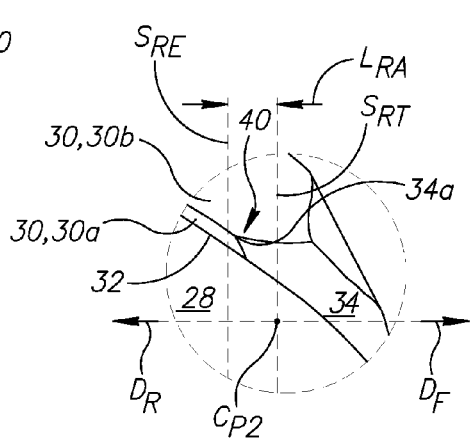
FIG.3A   FIG.3B

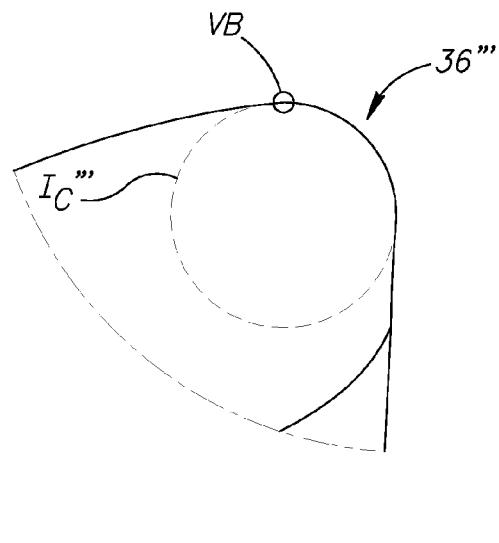
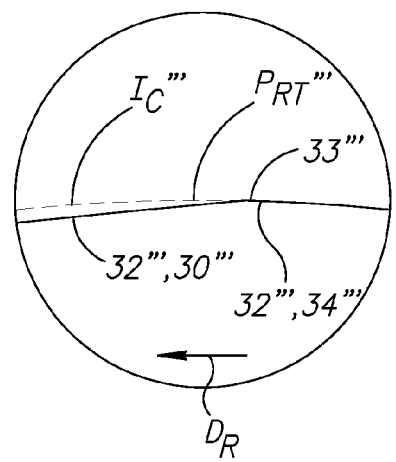
FIG.5A
(PRIOR ART)
FIG.5B
(PRIOR ART)
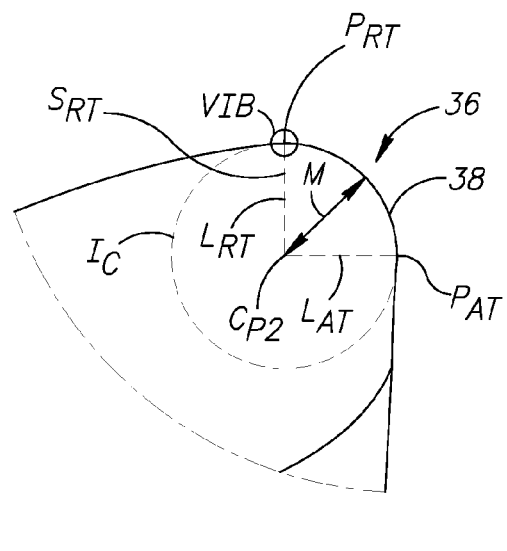
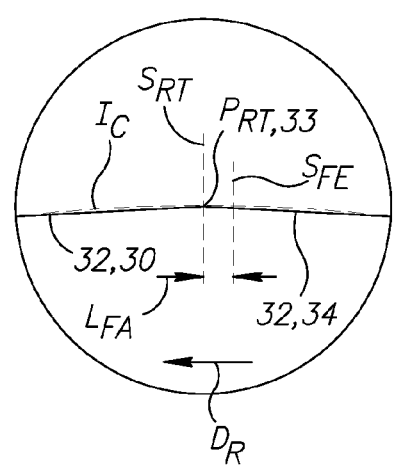
FIG.6A
FIG.6B

END MILL CONVEX RADIAL RELIEF SURFACE AND CORNER HAVING CIRCULAR ARC PROFILE

FIELD OF THE INVENTION

The subject matter of the present application relates to end mills of the integral tooth (i.e. not insert) type, having convex radial relief surfaces and corners with circular arc profiles, and in particular to end mills for finishing operations.

BACKGROUND OF THE INVENTION

End mills of the type referred to in this application have been the subject of continuous improvement during the last several decades.

Due to a competitive world-wide market, there is ever increasing demand for machining with end mills to provide higher finish and extended tool life, even when machining workpieces at high speeds and/or workpieces made of difficult to machine materials.

Accordingly, even a design modification which provides a size reduction of a discontinuity measurable in microns is considered a significant improvement in performance.

The present application is directed to end mill corners with convex radial relief surfaces and corner radius surfaces (which are flat or concave) connected thereto. To elaborate, an end mill can have, immediately adjacent to a cutting edge thereof, either a flat or concave radial relief surface or a convex radial relief surface. For the purposes of the specification and claims, a convex radial relief surface is defined as a radial relief surface having at least a portion thereof, immediately adjacent to a cutting edge, which is convexly-curved. It will be understood that a radial relief surface that comprises a convex portion immediately adjacent to a cutting edge and then a flat portion (i.e. a portion which, in a plane perpendicular to a rotation axis, follows a straight line) separated from the cutting edge by the convex portion, is also considered a convex radial relief surface. Aligning a flat or concave radial relief surface with a corner radius surface (which is flat or concave) without a surface mismatch is considered less problematic than aligning a convex radial relief surface with such corner radius surface. Therefore the subject matter of the present application refers only to end mills of the type having convex radial relief surfaces.

The present application is also specifically directed to end mills with corners having circular arc profiles. A corner's circular arc profile is presented during rotation of such end mills about a rotation axis and viewed in a direction perpendicular to the rotation axis. For the purposes of the specification and claims, this will be called a "profile view".

The circular arc profile defines a portion of an imaginary circle. The circle has a circle center point, axial and radial tangent lines, axial and radial tangent points, and a radius magnitude measurable from the circle center point to the circular arc profile. The axial tangent point is located at an intersection of the circle and the axial tangent line which extends forwardly from the circle center point and in a direction parallel with a rotation axis of the end mill. The radial tangent point is located at an intersection of the circle and the radial tangent line which extends radially outward from the circle center point and in a direction perpendicular with the rotation axis.

To describe further features of the end mills in this application, planes may also be defined from the circle. Specifically, a radial tangent plane extends perpendicular to the rotation axis, and both the circle center point and radial tangent point both lie in the radial tangent plane. The radial tangent line also lies in the radial tangent plane. Similarly, other radial lines described hereinafter can be understood to lie in corresponding radial planes extending perpendicular to the rotation axis.

It will be understood that the circle and associated lines, planes, tangent points and radius magnitude, are imaginary and hence are not visible features on an end mill but rather are derivable through the construction thereof.

SUMMARY OF THE INVENTION

In accordance with a first aspect of the subject matter of the present application, there is provided an end mill having a rotation axis defining forward and rearward directions, and comprising:
  front and rear ends, and a peripheral surface extending therebetween;
  a cutting portion extending rearwardly from the front end; and
  a shank portion located rearward of the cutting portion;
  the cutting portion comprising a tooth extending from the front end to the peripheral surface;
  the tooth comprising:
    a rake surface;
    a convex radial relief surface;
    a cutting edge formed at an intersection of the rake surface and the convex radial relief surface;
    a corner comprising a circular arc profile defining a portion of a circle having a circle center point, axial and radial tangent lines, axial and radial tangent points, a radial tangent plane, and a radius magnitude M measurable from the circle center point to the circular arc profile; and
    a corner relief surface connected to both the rake surface and the convex radial relief surface, and extending rearward of the radial tangent plane.

In accordance with another aspect of the subject matter of the present application, there is provided an end mill comprising rake and convex radial relief surfaces, and a corner relief surface connected to both the rake and convex radial relief surfaces.

In accordance with yet another aspect of the subject matter of the present application, there is provided an end mill comprising a cutting edge formed at an intersection of rake and convex radial relief surfaces, and a corner relief surface tangentially connected to the convex radial relief surface at the cutting edge.

In accordance with yet another aspect of the subject matter of the present application, there is provided an end mill comprising a corner with a circular arc profile defining a radial tangent point, rake and convex radial relief surfaces, and a corner relief surface, and wherein the radial tangent point and the end mill are aligned.

In accordance with yet another aspect of the subject matter of the present application, there is provided an end mill comprising: a cutting edge formed at an intersection of rake and convex radial relief surfaces, and a corner relief surface extending rearward of a radial tangent plane and also tangentially connected to the convex radial relief surface at the cutting edge.

In accordance with still another aspect of the subject matter of the present application, there is provided an end mill comprising a convex radial relief surface and a corner relief surface which extends rearward of a radial tangent plane.

In accordance with another aspect of the subject matter of the present application, there is provided an end mill comprising front and rear ends, rake and convex radial relief surfaces, and a corner relief surface connected to both the rake and convex radial relief surfaces and extending rearward from the front end by an amount greater than the radius magnitude.

It will be understood that possible advantages end mills according to the present application include size reduction of a discontinuity and/or mismatch at connected corner relief and convex radial relief surfaces. Consequently it is theoretically possible to improve tool life and/or surface finish on a work piece. Such advantages may also be achievable without the need for an additional manufacturing step (e.g. a gash).

It will be understood that the above-said is a summary, and that any of the aspects above may further comprise any of the features described hereinbelow. Specifically, the following features, either alone or in combination, may be applicable to any of the above aspects:

A. An end mill can have a rotation axis defining forward and rearward directions.
B. An end mill can comprise front and rear ends, and a peripheral surface extending therebetween.
C. An end mill can have a basic cylindrical shape.
D. An end mill can comprise a cutting portion extending rearwardly from a front end. The cutting portion can have a basic cylindrical shape.
E. A cutting portion can have a cutting portion diameter $D_C$.
F. A shank portion can be located rearward of a cutting portion.
G. A cutting portion can comprise a tooth, or a plurality of teeth. The tooth or teeth are integrally formed with the cutting portion. All of the teeth of a cutting portion can have the same features.
H. A tooth of a cutting portion can extend from a front end to a peripheral surface of the end mill.
I. A tooth can be smooth (i.e. not serrated).
J. A tooth can comprise a rake surface, a convex radial relief surface, and a cutting edge formed at an intersection of the rake surface and the convex radial relief surface.
K. A convex radial relief surface can comprise a convex portion immediately adjacent to a cutting edge and a flat portion separated from the cutting edge by the convex portion.
L. A tooth can comprise a corner.
M. A corner can comprising a circular arc profile defining a portion of a circle having a circle center point, axial and radial tangent lines, axial and radial tangent points, a radial tangent plane, and a radius magnitude M measurable from the circle center point to the circular arc profile.
N. A tooth can comprise a corner relief surface.
O. A corner relief surface can be connected to both rake and convex radial relief surfaces.
P. A corner relief surface can be tangentially connected to the convex radial relief surface at a cutting edge. The tangential connection of the corner relief surface to the radial relief surface at the cutting edge can be at or adjacent to a radial tangent plane. The tangential connection is considered to be adjacent to the radial tangent plane if it is rearward of a front extremity radial plane extending perpendicular to a rotation axis. The front extremity radial plane can be no further forward of a radial tangent plane than a front axial distance equal to 5% of a radius magnitude, preferably equal to 3% of the radius magnitude. Most preferably, the corner relief surface is only tangentially connected to the convex radial relief surface at an intersection of the cutting edge and the radial tangent plane.
Q. A corner relief surface can extend rearward of a radial tangent plane. The corner relief surface can end forward of a rear extremity radial plane extending perpendicular to the rotation axis. The rear extremity radial plane can be no further rearward of a radial tangent plane than a rear axial distance equal to 5% of a radius magnitude, preferably equal to 3% of the radius magnitude.
R. A radial tangent point and end mill can be aligned. When a radial length $L_R$ defined between the radial tangent point and the end mill is no greater than of 0.04% of a cutting portion diameter $D_C$ ($L_R \leq 0.04\% \, D_C$) the radial tangent point and end mill are considered aligned. Preferably, $L_R$ is no greater than of 0.02% of the cutting portion diameter $D_C$ ($L_R \leq 0.02\% \, D_C$). It will be understood that as the radial length $L_R$ tends to zero, there is considered to be closer, preferred, alignment.
S. A corner relief surface can have a corner relief extremity shape rearward of a radial tangent plane. The corner relief extremity shape can taper with increasing distance from the radial tangent plane. The corner relief extremity shape can be triangular i.e., V-shaped, as illustrated in FIG. 3B.

BRIEF DESCRIPTION OF THE DRAWINGS

For a better understanding of the subject matter of the present application, and to show how the same may be carried out in practice, reference will now be made to the accompanying drawings, in which:

FIG. 2A is a schematic side view of a part of a cutting portion of a prior art end mill (rotated slightly in a cutting direction relative to a profile view);

FIG. 2B is a schematic enlarged view of an encircled portion designated IIB in FIG. 2A;

FIG. 3A is a similar view to FIG. 2A, particularly, a schematic side view of a part of a cutting portion of the end mill in FIGS. 1A and 1B (rotated slightly in a cutting direction relative to the profile view in FIG. 1A);

FIG. 3B is a schematic enlarged view of an encircled portion designated IIIB in FIG. 3A;

FIG. 5A is a schematic profile view of a corner of a cutting portion of a prior art end mill;

FIG. 5B is a schematic enlarged view of an encircled portion designated VB in FIG. 5A;

FIG. 6A is a schematic profile view of a corner of a cutting portion of the end mill in FIGS. 1A, 1B, 3A and 3B; and FIG. 6B is a schematic enlarged view of an encircled portion designated VIB in FIG. 6A.

DETAILED DESCRIPTION

Figure 1A:
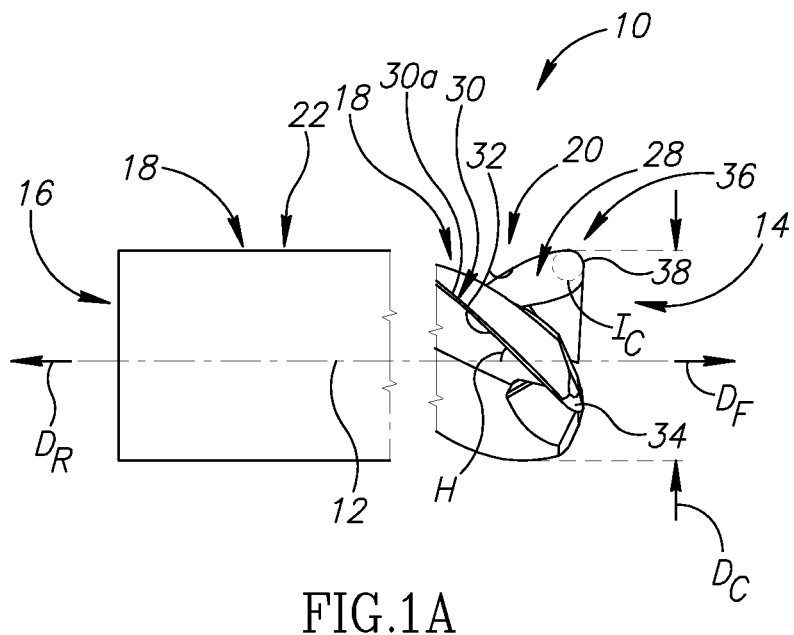
FIG. 1 is a schematic side view of an end mill in accordance with the subject matter of the present application, including a profile view of the corner in the top right hand corner.
FIG. 1B is a schematic front end view of the end mill in FIG. 1A.
Figure 1B:
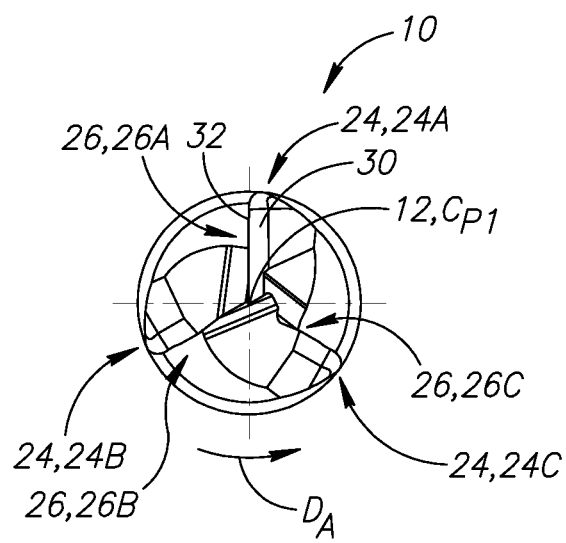

Reference is made to FIGS. 1A and 1B, which illustrate an end mill 10, typically made of extremely hard and wear-resistant material such as cemented carbide, and particularly configured for finishing machining operations.

The end mill 10 is configured to rotate about a rotation axis 12, which can extend longitudinally through the center thereof and coincide with an end mill center point $C_{P1}$. In this example an end mill rotation direction $D_A$ is counter-clockwise in the front end view shown in FIG. 1B. The rotation axis 12 can define a forward direction $D_F$ and an opposite rearward direction $D_R$ (noting that while these directions are parallel with the rotation axis 12 they need not be coaxial therewith).

The end mill 10 can comprise a front end 14, a rear end 16 distally located from the front end 14, and a peripheral surface 18 extending between the front and rear ends 14, 16.

The end mill 10 can comprise a cutting portion 20 and a shank portion 22 located rearward of the cutting portion 20.

The cutting portion 20 can comprise a cutting portion diameter $D_C$ and can extend rearwardly from the front end 14.

The cutting portion 20 can comprise at least one tooth 24 (e.g., first, second and third teeth 24A, 24B, 24C).

Each tooth 24 can be smooth (i.e. non-serrated) for improved workpiece finish.

The cutting portion 20 can comprise a flute 26 circumferentially located between adjacent teeth 24 (e.g. flute 26A can be circumferentially located between the first and second teeth 24A, 24B). The cutting portion 20 can comprise a plurality of flutes 26 (e.g., first, second and third flutes 26A, 26B, 26C). Each flute 26 can have a helix angle H (e.g. constant or variable) formed with the rotation axis 12.

Referring also to FIG. 3B, each tooth 24 can comprise a rake surface 28, a convex radial relief surface 30, a cutting edge 32 formed at an intersection of the rake surface 28 and the convex radial relief surface 30, and a corner relief surface 34 connected to the rake surface 28 and the convex radial relief surface 30.

The convex radial relief surface 30 can comprise a convex portion 30a immediately adjacent to the cutting edge 32 and a flat portion 30b separated from the cutting edge 32 by the convex portion 30a. While not limited thereto, the subject matter of the present application is considered particularly beneficial for a convex radial relief surface having such convex and flat portion 30a, 30b construction.

Each tooth 24 can extend from the front end 14 to the peripheral surface 18.

At an intersection of the front end 14 and peripheral surface 18, each tooth 24 can comprise a corner 36.

In the profile view shown in FIG. 1A, during rotation of the end mill 10 about the rotation axis 12, the corner 36 presents a circular arc profile 38 defining a portion of an imaginary circle $I_C$.

Drawing attention to FIG. 6A, the circle $I_C$ can have a circle center point $C_{P2}$, axial and radial tangent lines $L_{AT}$, $L_{RT}$, axial and radial tangent points $P_{AT}$, $P_{RT}$ and a radius magnitude M measureable from the circle center point $C_{P2}$ to the circular arc profile 38.

The axial tangent point $P_{AT}$ is located at an intersection of the circle $I_C$ and the axial tangent line $L_{AT}$ extending forwardly from the circle center point $C_{P2}$ and in a direction parallel with the rotation axis 12 of the end mill 10. The radial tangent point $P_{RT}$ is located at an intersection of the circle $I_C$ and the radial tangent line $L_{RT}$ extending from the circle center point $C_{P2}$ and in a radially outward direction perpendicular with the rotation axis 12. A radial tangent plane $S_{RT}$ is defined perpendicular to the rotation axis 12 and includes the radial tangent line $L_{RT}$. Stated differently, the radial tangent plane $S_{RT}$ can be defined as a plane extending perpendicular to the rotation axis 12, and including both the circle center point $C_{P2}$ and radial tangent point $P_{RT}$. The radial tangent plane $S_{RT}$ is spaced from the axial tangent point $P_{AT}$ by the radius magnitude M.

Generally speaking, after a location of a circle center point (or, more precisely, an axial distance between the circle center point and an axial tangent point, which will also be equal to a radius magnitude) has been determined (e.g. during rotation of an end mill and observation from a profile view such as that shown in FIG. 6A), the position of a radial tangent plane, which is a plane perpendicular to an end mill rotation axis, and on which the circle center point lies, can be established. After the radial tangent plane's location is determined, an end mill can be rotated about the rotation axis and other features such as the extent of the corner relief surface relative to the position of the radial tangent plane can be determined.

Drawing attention to FIGS. 2A and 2B, a prior art end mill cutting portion 20' is shown for comparative purposes, with corresponding features having the same reference characters also suffixed with an apostrophe (').

Notably, a rearmost corner relief point 34a' of the prior art corner relief surface 34' is located forward of a radial tangent plane $S_{RT}'$. By contrast, the corner relief surface 34 in FIGS. 3A and 3B extends rearward of the radial tangent plane $S_{RT}$.

Rearward of the radial tangent plane $S_{RT}$, the corner relief surface 34, proximate to a rearmost corner relief point 34a of the corner relief surface 34, can have a corner relief extremity shape 40. As shown, the extremity shape 40 can be tapered. The corner relief extremity shape 40 can be considered triangular i.e., V-shaped, as illustrated in FIG. 3B.

The rearmost corner relief point 34a is located forward of a rear extremity radial plane $S_{RE}$. A rear axial distance $L_{RA}$ defined between the radial tangent plane $S_{RT}$ and the rear extremity radial plane $S_{RE}$ can be equal to 5% or less of the radius magnitude M (FIG. 6A).

Figure 4A:
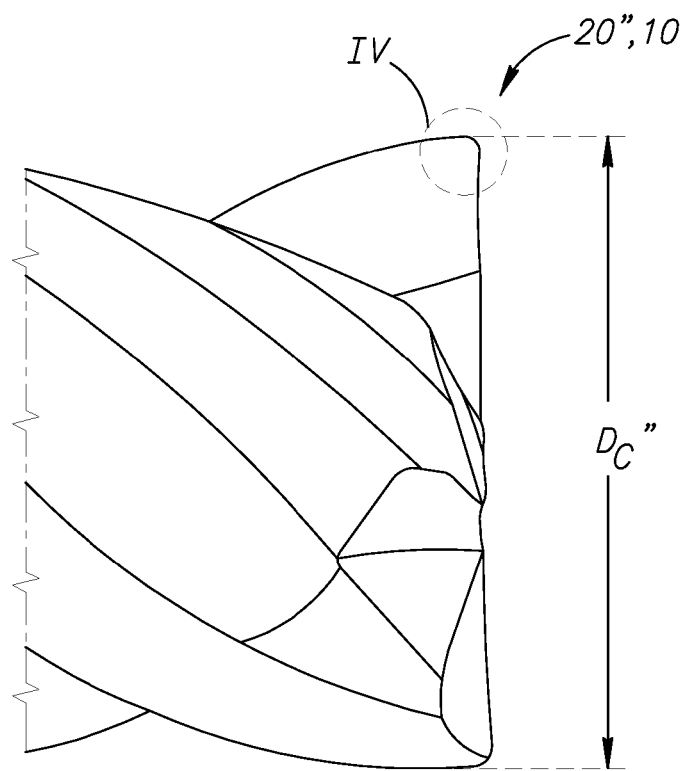
FIG. 4A shows a side view of a part of a cutting portion of a prior art end mill (including a profile view of the corner in the top right hand corner)
Figure 4B:
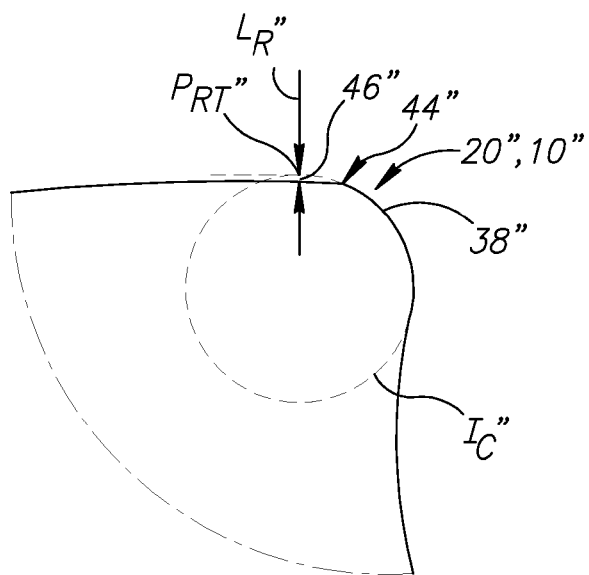
FIG. 4B is a schematic enlarged view of an encircled portion designated IVB in FIG. 4A.

Drawing attention to FIGS. 4A and 4B, a prior art end mill cutting portion 20" is shown for comparative purposes, with corresponding features having the same reference characters also suffixed with two apostrophes ("), and all other reference characters in these figures also being suffixed with two apostrophes (").

The circular arc profile 38" notably ceases to follow the circle $I_C$" at a discontinuity designated as 44". Consequently, there is a radial gap 46" between the radial tangent point $P_{RT}$" which is located on the circle $I_C$" and the end mill 10". The radial gap 46" can have a radial length $L_R$" measurable from the radial tangent point $P_{RT}$" to the end mill 10" in a direction perpendicular to the rotation axis 12.

By contrast, referring to FIG. 6A, the circular arc profile 38 follows the circle $I_C$, and a radial length $L_R$ (not shown) is no greater than of 0.04% of a cutting portion diameter $D_C$ (FIG. 1A). In the example shown a radial length $L_R$ is not indicated because it is so small that it is not visible.

Drawing attention to FIGS. 5A and 5B, a prior art end mill cutting portion is shown for comparative purposes, with corresponding features having the same reference characters also suffixed with three apostrophes (''').

In FIG. 5B, a connection point 33''' is shown where a corner relief surface 34''' is connected to a curved radial relief surface 30''' at the cutting edge 32'''. Notably, the corner relief surface 34''' is non-tangentially connected to the radial relief surface 30''' at the cutting edge 32''' significantly forward of the radial tangent point $P_{RT}'''$. Consequently, the paths of the radial relief surface 30''' and the circle $I_C'''$ diverge rearward of the connection point 33'''.

By contrast, FIG. 6B shows a connection point 33 where the corner relief surface 34 is connected to the radial relief surface 30 at the cutting edge 32. The connection point 33 can be forward of the radial tangent plane $S_{RT}$, but should still be rearward of a front extremity radial plane $S_{FE}$ (which is a plane parallel with the radial tangent plane $S_{RT}$). The front extremity radial plane $S_{FE}$ is no further forward of the radial tangent plane $S_{RT}$ than by a front axial distance $L_{FA}$ equal to 5% of the radius magnitude M (FIG. 6A). Most preferably, as shown, the tangential connection is at the radial tangent point $P_{RT}$. Additionally, the corner relief surface 34 is tangentially connected to the radial relief surface 30 at the cutting edge 32.

As shown, the paths of the radial relief surface 30 and the circle $I_C$ are aligned rearward of the radial tangent plane $S_{RT}$.

The description above includes an exemplary embodiment and details, and does not exclude non-exemplified embodiments and details from the claim scope of the present application.

What is claimed is:

1. An end mill having a rotation axis defining forward and rearward directions, and comprising:
    front and rear ends, and a peripheral surface extending therebetween;
    a cutting portion extending rearwardly from the front end; and
    a shank portion located rearward of the cutting portion;
    the cutting portion comprising a tooth extending from the front end to the peripheral surface;
    the tooth comprising:
        a rake surface;
        a convex radial relief surface;
        a cutting edge formed at an intersection of the rake surface and the convex radial relief surface, wherein the convex radial relief surface has at least a portion thereof, immediately adjacent to the cutting edge, which is convexly-curved
        a corner comprising a circular arc profile defining a portion of an imaginary circle having:
            a circle center point with a radius magnitude M measurable from the circle center point to the circular arc profile,
            an axial tangent line which extends forwardly from the circle center point in a direction parallel with the rotation axis,
            an axial tangent point located at an intersection of the circle and the axial tangent line,
            a radial tangent line which extends radially outward from the circle center point and in a direction perpendicular with the rotation axis;
            a radial tangent point located at an intersection of the imaginary circle and a radial tangent line, and
            a radial tangent plane which extends perpendicular to the rotation axis and in which the circle center point, the radial tangent point and the radial tangent line, all lie;
        and
        a corner relief surface connected to both the rake surface and the convex radial relief surface, and extending rearward of the radial tangent plane.

2. The end mill according to claim 1, wherein the corner relief surface is tangentially connected to the convex radial relief surface at the cutting edge.

3. The end mill according to claim 2, wherein the tangential connection of the corner relief surface to the convex radial relief surface at the cutting edge is rearward of a front extremity radial plane extending perpendicular to the rotation axis, the front extremity radial plane being no further forward of the radial tangent plane than a front axial distance equal to 5% of the radius magnitude M.

4. The end mill according to claim 3, wherein the front extremity radial plane is no further forward of the radial tangent plane than a front axial distance equal to 3% of the radius magnitude.

5. The end mill according to claim 1, wherein the corner relief surface is only tangentially connected to the convex radial relief surface at an intersection of the cutting edge and the radial tangent plane.

6. The end mill according to claim 1, wherein the convex radial relief surface comprises a convex portion immediately adjacent to the cutting edge and a flat portion separated from the cutting edge by the convex portion.

7. The end mill according to claim 1, wherein the corner relief surface ends forward of a rear extremity radial plane extending perpendicular to the rotation axis, the rear extremity radial plane being no further rearward of the radial tangent plane than a rear axial distance equal to 5% of the radius magnitude.

8. The end mill according to claim 7, wherein the rear extremity radial plane is no further rearward of the radial tangent plane than a rear axial distance equal to 3% of the radius magnitude.

9. The end mill according to claim 1, wherein:
    the cutting portion has a cutting portion diameter $D_C$, and
    the radial tangent point on the imaginary circle is spaced apart from the end mill by a radial length $L_R$ no greater than 0.04% of the cutting portion diameter $D_C$ ($L_R \leq 0.04\% D_C$).

10. The end mill according to claim 9, wherein $L_R$ is no greater than of 0.02% of the cutting portion diameter $D_C$ ($L_R \leq 0.02\% D_C$).

11. The end mill according to claim 1, wherein the tooth is smooth.

12. The end mill according to claim 1, wherein the corner relief surface has a corner relief extremity shape rearward of a radial tangent plane, the corner relief extremity shape tapering with increasing distance from the radial tangent plane.

13. The end mill according to claim 12, wherein the corner relief extremity shape is V-shaped.

* * * * *